Feb. 27, 1934.  G. H. CURTISS  1,948,745
MOTOR VEHICLE
Filed July 3, 1930  2 Sheets-Sheet 1
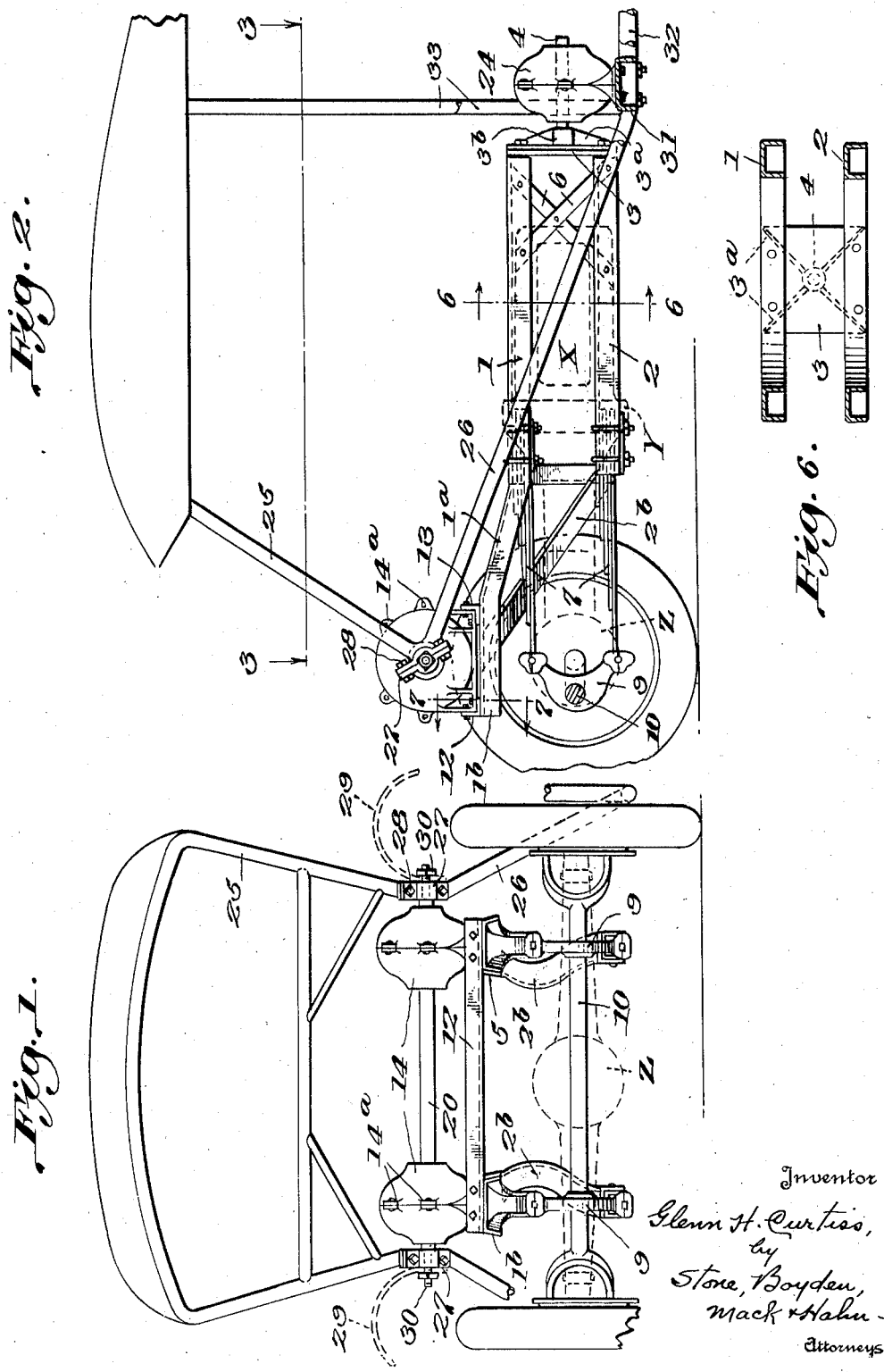

Feb. 27, 1934.  G. H. CURTISS  1,948,745
MOTOR VEHICLE
Filed July 3, 1930   2 Sheets-Sheet 2
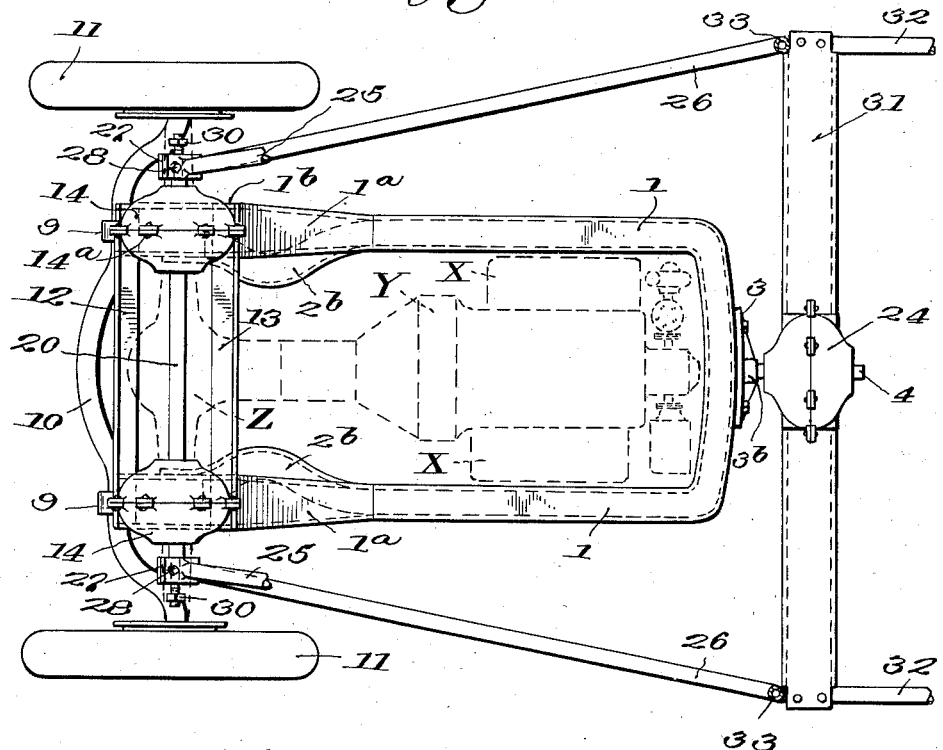
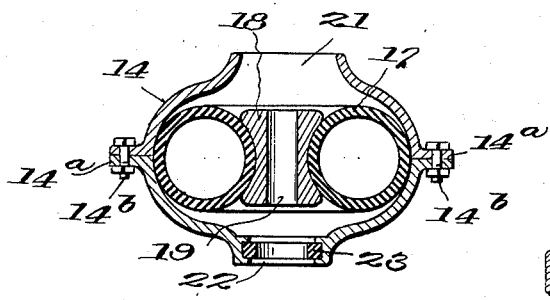
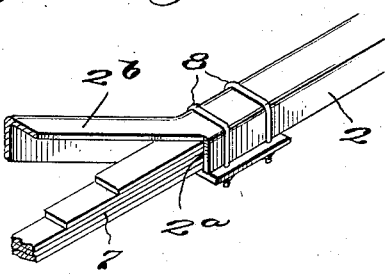
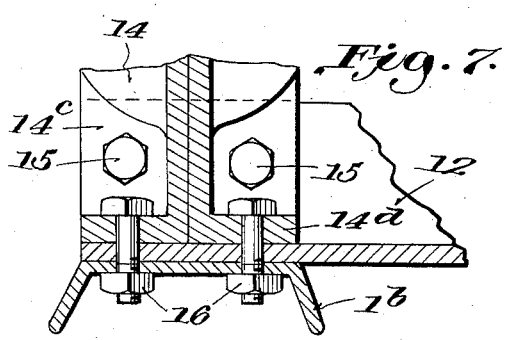
Inventor
Glenn H. Curtiss,
By Stone, Boyden, Mack & Hahn,
Attorneys.

Patented Feb. 27, 1934

1,948,745

UNITED STATES PATENT OFFICE 1,948,745

MOTOR VEHICLE

Glenn H. Curtiss, Hammondsport, N. Y.; Lena P. Curtiss sole executrix and trustee of estate of said Glenn H. Curtiss, deceased Application July 3, 1930. Serial No. 465,749

8 Claims. (Cl. 180—12)

This invention relates to motor vehicles and more particularly to passenger automobiles.

Specifically, the present invention is in the nature of a further development of the type of vehicle shown in my prior copending application Ser. No. 376,985, filed July 9, 1929.

In both cases, the invention has particular utility when embodied in a motor vehicle of the front drive type. In the above mentioned copending application, I have shown a vehicle of this type consisting of separate body and power units, such units being connected by means of resilient coupling devices so that the vibration of the motor is cushioned and not transmitted to the passenger carrying compartment.

The present invention seeks to provide a motor vehicle of this type having improved details of construction and arrangement, and in which the resilient coupling devices are differently disposed. In the present design, also, the connection between the body unit and power unit is rendered even more easily detachable than in my prior application, and an improved motor supporting frame is provided and so designed that the cylinder heads of the motor may be readily accessible from either side of the vehicle. Furthermore, an object of the present design is to keep the center of gravity of the vehicle as a whole, and particularly of the power unit, as low as possible.

In order that the invention may be readily understood, reference is had to the accompanying drawings forming part of this specification, and in which:

Fig. 1 is a front elevation of a motor vehicle embodying the essential features of the invention;

Fig. 2 is a fragmentary side elevation thereof, parts being in section;

Fig. 3 is a sectional plan view on the line 3—3 of Fig. 2;

Fig. 4 is a transverse section on an enlarged scale through one of my improved resilient coupling devices;

Fig. 5 is a fragmentary perspective view showing a detail of construction of my improved motor supporting frame;

Fig. 6 is a transverse vertical section on the line 6—6 of Fig. 2, looking in the direction of the arrows; and Fig. 7 is a fragmentary vertical section on an enlarged scale taken along the line 7—7 of Fig. 2, looking in the direction of the arrows.

Referring to the drawings in detail, my improved power unit comprises a motor supporting frame formed of a pair of horizontally disposed vertically spaced U-shaped members 1 and 2. Each of these members is preferably formed of channel iron bent as shown. The two members are rigidly united at their rear ends by any suitable means, the means shown in the drawing by way of illustration consisting of a plate 3 secured to the rear edges of the U-shaped members 1 and 2 as by bolts or rivets. This plate carries a central boss $3^b$ supported by radial strengthening flanges $3^a$, and in the boss $3^b$ is rigidly set a rearwardly and horizontally projecting stub shaft or trunnion 4, for a purpose hereinafter described. The sides of the U-shaped members 1 and 2 may be further strengthened by cross braces 6 or the like, as shown in Fig. 2.

The end portions of the legs of the upper member 1 are preferably inclined upwardly as shown at $1^a$ in Fig. 2 and are somewhat widened as indicated at $1^b$, the upper surface of the widened portions being substantially horizontal and the flanges preferably flaring outwardly, as shown in Fig. 1.

The forward end portions of the lower member 2 are also inclined upwardly as indicated at $2^b$, the outer flange of the channel being cut away however, beginning at the point $2^a$ (see Fig. 5) so that the upwardly inclined portion $2^b$ is only an angle iron. These portions $2^b$ are bent or curved inwardly in order to clear the springs, hereinafter described, as clearly shown in Figs. 1 and 3, and the extreme upper and forward ends of these portions $2^b$ are secured to the inner flange of the portions $1^b$ of the upper member, as indicated at 5 in Fig. 1. The upper flange of the angle shaped members $2^b$ is, of course, cut away adjacent the point 5 so as to permit the arrangement just described, as will be readily understood.

As in my prior application, a pair of quarter elliptic springs is employed at each side of the power unit. In the present case, however, the butt ends of these springs fit within the legs of the channel members 1 and 2 and are securely clamped in position therein by means of U-bolts 8 or the like, as clearly shown in Fig. 5. The forward or free ends of the springs 7 are supported on brackets 9 rigid with a fixed front axle 10 which, as indicated in Fig. 3, is preferably of arched or bowed form. At the ends of this axle are journaled the driving wheels 11 which, of course, are mounted on suitable steering knuckles in the usual way or any desired manner.

Extending transversely across the vehicle in a substantially horizontal plane are a pair of spaced angle irons 12 and 13 resting upon and secured to the upper surface of the widened portions 1ᵇ of the upper frame member 1. These angle irons serve to tie the ends of the frame member 1 together and also farm a rigid support for the resilient coupling members now to be described.

Preferably two of these resilient coupling members are mounted at the front of the vehicle on the angle irons 12 and 13, each being designated in its entirety by the reference numeral 14. These coupling members are disposed one at each side of the vehicle and preferably immediately above the axis of the wheels 11.

As in my prior copending case, each of these resilient coupling members comprises a rim portion and a hub or socket portion, the construction of which is clearly illustrated in Fig. 4. By reference to this figure it will be seen that the rim portion is formed of two axially separable sections held together by means of a circumferential series of pairs of lugs 14ᵃ through which pass bolts 14ᵇ. The two sections of the rim portion are also provided with flanges 14ᶜ (see Fig. 7) through which pass bolts 15 securing such flanges to the angle irons 12 and 13. Bolts 16 also pass downwardly through outwardly turned horizontal flanges 14ᵈ, through the lower flange of the angle irons 12 and 13, and through the widened portions 1ᵇ of the frame member 1.

Housed within the above described annular rim member is an annular cushioning element 17. This is preferably in the form of a pneumatic tube or ring but may be of solid rubber or the like.

Fitting within the center of this resilient annular cushioning element is a hub or socket member 18 having an axial opening 19 extending therethrough.

A supporting rod or shaft 20 extends through the alined openings 19 in the two socket members 18 and projects at each side of the vehicle somewhat beyond the coupling members 14, as shown in Figs. 1 and 3.

The rim portion of each of these coupling members has at one side relatively large openings 21, the edge of which is spaced a substantial distance from the shaft 20. On the opposite side, however, the rim portion is provided with a smaller opening 22 in which is set a rubber or other packing ring 23, as clearly shown in Fig. 4. The interior diameter of this packing ring is slightly larger than the shaft 20 so that normally a clearance is provided between the shaft and said ring, which clearance is sufficient to permit free movement of the shaft, due to yielding of the cushion element. If, however, this cushion element should burst or collapse, or otherwise fail, then the shaft 20 comes into engagement with the ring 23 and is thus temporarily supported until the cushion element can be renewed or repaired. In other words, the ring 23 constitutes an emergency stop for holding the shaft, in case of failure of the supporting cushion.

In assembling the body and power units of my improved vehicle, I preferably employ three resilient coupling members or devices, such as shown in detail in Fig. 4. Two of such devices have already been described and the third is designated at 24, and is similar in all respects to those indicated at 14 and heretofore described in detail.

This third yieldable coupling member has its rim portion secured to and rigidly supported by a transverse member 31 of the body unit frame hereinafter described, such member being shown as of channel section.

The frame of my improved body unit comprises essentially upwardly extending members 25 and longitudinally extending members 26, disposed at an actue angle to each other and to the horizon, as shown in Fig. 2, the forward ends of these members at each side of the vehicle being rigidly joined together as by welding. At each corner of the frame thus formed is provided a split clamp 27, the parts of which are held together by bolts 28 and which is adapted to embrace and grip the projecting ends of the shaft 20, as well illustrated in the drawings.

As shown in Fig. 1, the usual fenders, illustrated in dotted lines at 29, may be also secured to this body frame and held in position as by means of nuts 30 fitted onto the reduced threaded ends of the shaft 20.

The body frame also comprises horizontally disposed side members 32 and vertical struts 33 which may be of tubular, channel or any other desired section. The transverse member 31, heretofore referred to, and which is shown as of channel section, extends between and is rigidly secured to the two side members 32.

It will be noted that the resilient coupling device 24 is located at the middle of the transverse member 31 or, in other words, in the longitudinal center or axis of symmetry of the vehicle. The rear end of the motor supporting frame 1 and 2 is supported in the resilient member 24 by means of the stub shaft 4 which extends through and fits within the socket member 18 inside of the device 24.

It will be further noted that the motor supporting frame 1, 2 is substantially horizontal throughout and that the stub shaft 4 is no higher than and is preferably in the same horizontal plane as the axle 10. Thus the center of gravity of the entire vehicle is maintained very close to the road.

It will likewise be observed that the two forward resilient coupling members 14 are disposed on a common axis parallel with and above the axis of the wheels 11, and that the member 24 is located at a relatively great distance to the rear of the axle, thus lending great stability to the assembly. It will be still further seen that the body unit is resiliently supported at each side of the vehicle on the coupling devices 14 and that it is therefore capable of teetering laterally as the cushioning devices within the members 14 yield, such teetering causing the body unit to turn or rock relative to the power unit about the stub shaft 4 as an axis. This arrangement produces an unusually flexible connection between the two units and permits the body to partake of independent movement. Similarly the power unit is capable of slightly turning or twisting movement about the axis of the stub shaft 4 without imparting such movement to the body unit.

As already stated, one of the objects of the present invention is to provide a construction in which the body and power units can be readily and quickly separated or detached from each other. In the design described above, it is only necessary to take out the bolts 28 at each side of the vehicle, thus disengaging the clamps 27 from the shaft 20. When this is done the two units can be shifted longitudinally relative to each other, thus withdrawing the stub shaft 4 from the socket of the coupling member 24 and entirely separating the two units, which, as will be seen, are structurally independent of each other.

In connection with my improved motor supporting frame above described, I preferably employ an internal combustion engine or motor of the opposed horizontal cylinder type. The two sets of cylinders are designated at X in dotted lines (see Fig. 3) and the engine as a whole at Y. Any suitable transmission mechanism may be employed, and this is connected to differential gearing indicated at Z, from which extend the usual live axles through suitable universal joints (not shown) to the driving wheels 11. This motor and its connection with the driving wheels form no part of my present invention, except insofar as the motor is of the horizontal cylinder type. This type of motor is particularly advantageous in connection with the special supporting frame which I have devised, in that the cylinder heads X of the motor are accessible through the space between the upper and lower frame members 1 and 2, as indicated in Fig. 2.

What I claim is:—

1. A motor vehicle comprising a body unit, and a separate power unit having an axle and a pair of driving wheels, and a plurality of spaced universally yieldable coupling members detachably connecting said units, some of said coupling members being located substantially above said axle, and another of said members being located in substantially the same horizontal plane as said axle and at a relatively great distance from it longitudinally of the vehicle.

2. A motor vehicle comprising a body unit, and a separate power unit having an axle and a pair of driving wheels, and a plurality of spaced annular yieldable coupling members detachably connecting said units, some of said coupling members being disposed on a common axis parallel with said axle, and another of said members having its axis disposed at right angles to said axle and lying in substantially the same horizontal plane.

3. A motor vehicle comprising a body unit, and a separate power unit having an axle and a pair of driving wheels, said power unit being located at the front end of said body unit, and a plurality of spaced, yieldable coupling members detachably connecting said units, and permitting relative movement thereof both longitudinally and transversely two of said coupling members being mounted side by side above said axle, and another of said coupling members being disposed at a substantial distance to the rear of said axle and in approximately the same horizontal plane.

4. A motor vehicle comprising a body unit, and a separate power unit having an axle and a pair of driving wheels, said power unit being located at the front end of said body unit, and comprising a horizontally and longitudinally extending frame spring supported at its forward end on said axle, means independent of such spring support for resiliently connecting the front end of said body unit to said frame at a plurality of transversely spaced points, a trunnion projecting rearwardly from the center of the back end of said frame, and a socket member carried by the body unit at a point no higher than said axle in which member said trunnion is journaled.

5. In a motor vehicle, the combination with a body unit, of a power unit associated therewith, said power unit comprising an axle and a pair of horizontally extending vertically spaced frame members supported at their forward ends on said axle, the rear ends of said frame members being secured together and to the body unit, and a motor of the horizontal cylinder type supported by said frame members and so mounted that the cylinder heads are accessible through the space between said frame members.

6. In a motor vehicle, the combination with an axle, and a motor of the horizontal cylinder type for driving the same, of a supporting frame work for said motor comprising a pair of horizontally extending U-shaped frame members rigidly united at one end and spaced apart vertically a sufficient distance to afford access to the cylinder heads between them.

7. In a motor vehicle, the combination with a motor and axle, of a supporting frame to which the motor is rigidly secured comprising a channel member bent to U-shape and disposed in a horizontal plane, and a quarter-elliptic spring held at its butt end within the channel at each end of said U-shaped member, and connected at its other end with said axle.

8. In a motor vehicle, a power unit and a body unit, and means for uniting said units, said means including a resilient coupling member comprising rim and socket portions, having an annular cushioning element interposed therebetween, and a shaft adapted to fit within said socket portion, said rim portion having at one side an opening in which is mounted a packing ring through which said shaft loosely passes, the interior of said ring being larger than said shaft and normally out of contact therewith, but serving to support the same upon failure of said cushioning element.

GLENN H. CURTISS.